United States Patent [19]

Quate et al.

[11] Patent Number: 5,066,358
[45] Date of Patent: Nov. 19, 1991

[54] NITRIDE CANTILEVERS WITH SINGLE CRYSTAL SILICON TIPS

[75] Inventors: Calvin F. Quate; Marco Tortonese, both of Stanford, Calif.

[73] Assignee: Board of Trustees of the Leland Stanford Juninor University, Stanford, Calif.

[21] Appl. No.: 427,788

[22] Filed: Oct. 27, 1988

[51] Int. Cl.⁵ .................. G01B 5/28; H01L 21/306
[52] U.S. Cl. .................... 156/647; 156/657; 156/659.1; 156/662; 204/129.65; 250/306
[58] Field of Search ........... 156/647, 657, 662, 659.1, 156/653; 204/129.1, 129.65; 205/306, 307

[56] References Cited

U.S. PATENT DOCUMENTS

| | | | |
|---|---|---|---|
| 4,307,507 | 12/1981 | Gray et al. | 156/647 X |
| 4,685,996 | 8/1987 | Busta et al. | 156/657 X |
| 4,912,822 | 4/1990 | Zdeblick et al. | 250/306 X |
| 4,916,002 | 4/1990 | Carver | 156/657 X |
| 4,943,719 | 7/1990 | Akamine et al. | 156/647 X |
| 4,968,382 | 11/1990 | Jacobson et al. | 156/657 X |
| 4,968,585 | 11/1990 | Albrecht et al. | 156/659.1 X |

*Primary Examiner*—David A. Simmons
*Assistant Examiner*—Thi Dang
*Attorney, Agent, or Firm*—Flehr, Hohbach, Test, Albritton & Herbert

[57] ABSTRACT

A nitride cantilever is formed with an integral conical silicon tip at the free end thereof. A top layer of silicon dioxide is patterned into a tip mask on a doped or epitaxial silicon layer in a silicon substrate. Photoresist is spun on the silicon substrate and patterned and the silicon is etched to define a cantilever pattern in the substrate with the tip mask positioned to be near the free end of a nitride cantilever to be subsequently formed. A bottom layer of silicon dioxide is formed on the silicon substrate and then patterned and etched to define a masking aperture on the bottom silicon dioxide layer. The bottom of the silicon substrate is anisotropically etched through the masking aperture and the etch stops at the doped silicon layer. Alternatively, electrochemical etching is done by applying an electric potential across the P-N junction between the doped silicon layer and the appropriately-doped substrate. This releases the free end of the doped silicon layer from the silicon substrate. The anisotropic etch preferentially etches all of the crystal planes of the silicon substrate except the (111) planes to leave a silicon base from which extends the silicon surface layer as a cantilever. A nitride layer is then formed on the silicon substrate and dry etched from the top surface of the doped silicon surface layer to form a nitride cantilever on the bottom of the silicon substrate. The doped silicon layer is etched away while the tip mask helps to form a pointed silicon tip near the free end of the nitride cantilever.

A microfabricated cantilever includes a (100) silicon base having a (111) oblique side. A nitride layer is formed over the (111) oblique side of the silicon base and extends outwardly from the top surface of the silicon base to form a nitride cantilever having one end fixed to the silicon base and having a free end. On the free end is fixed a single-crystal sharp conical silicon tip which extends upwardly.

12 Claims, 2 Drawing Sheets

NITRIDE CANTILEVERS WITH SINGLE CRYSTAL SILICON TIPS

This invention was made with United States Government support under ONR/DARPA Contract No. N00014-84-K-0624. The Government has certain rights in this invention.

BACKGROUND OF THE INVENTION

1. Field of the Invention

This invention relates to microfabricated cantilevers with silicon tips and to methods of fabricating the same.

2. Prior Art

A number of microminiature tips and processes for fabricating microminiature tips using techniques borrowed from fabrication processes for semiconductor integrated circuits have been developed. These tips are used in atomic force microscopes AFM's, scanning tunnelling microscopes STM's, and in various other applications requiring sharp microminiature tips. Some of these processes fabricate a tip first and then form a cantilever.

SUMMARY OF THE INVENTION

It is an object of the invention to provide a robust silicon nitride cantilever with an integrally attached sharp single-crystal silicon tip.

In accordance with this and other objects of the invention, a method of forming a microfabricated cantilever having an integral silicon tip at the free end thereof is provided. The top surface of a (100) silicon substrate is doped to form a doped silicon layer in the substrate. A top layer of silicon dioxide is formed on the doped silicon layer and patterned and etched to provide a tip mask for subsequent formation of a silicon tip. The surface of the silicon substrate is patterned and etched to define a cantilever pattern with the tip mask positioned to be near the free end of a cantilever to be subsequently formed. A bottom layer of silicon dioxide is formed on the silicon substrate and patterned and etched to define a masking aperture in the bottom silicon dioxide layer. The bottom of the silicon substrate is anisotropically etched through the masking aperture and is stopped at the doped silicon layer. This releases the free end of the doped silicon layer from the silicon substrate. The anisotropic etching preferentially etches all of the crystal planes of the silicon substrate except for the (111) planes to leave the silicon base from which extends a doped silicon surface layer which functions as a cantilever member. The bottom layer of silicon dioxide is removed. A layer of nitride is formed over the lower surface of the doped silicon surface layer as well as over the bottom surface of the silicon substrate to thereby form a nitride cantilever beneath the doped silicon layer. The doped silicon layer is etched with the tip mask still remaining on it to form a pointed silicon tip near the free end of the nitride cantilever and to leave a nitride cantilever having an integrally formed silicon tip at its free end.

According to one aspect of the invention, the top surface of the silicon substrate is doped. According to another aspect of the invention the top surface is an N-type epitaxial layer on a P-type substrate. Alternatively, anisotropic etching is accomplished by applying an electric potential across the P-N junction formed by the top layer and the oppositely-doped substrate.

The tip mask is formed as a rectangular-shaped layer of silicon dioxide to produce a tip which is conical-shaped. A plurality of tip masks and a corresponding plurality of nitride cantilever each with an integrally formed silicon tip is provided according to another aspect of the invention.

The silicon base is formed in one aspect of the invention with a (100) silicon substrate and is anisotropically etched through the masking aperture to leave a (111) plane extending obliquely down and away from the nitride cantilever.

The silicon tip formed at the end of the nitride cantilever is optionally sharpened under appropriate conditions by differentially oxidizing the original tip such that the oxide layer formed on the point of the tip has a lesser thickness than the sides of the tip. When the oxide layer is removed from the tip it forms a sharpened tip having a sharper profile than the original silicon tip.

A microfabricated cantilever structure having an integral silicon tip includes a (100) silicon base portion having a top surface, bottom surface and a (111) oblique side surface. A nitride layer is formed over the (111) oblique side of the silicon base and extends outwardly from the top surface of the silicon base to form a nitride cantilever having one end fixed to the silicon base and having a free end. On the free end is a single-crystal sharp conical silicon tip which is affixed to and extends upwardly to the free end of the nitride cantilever.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
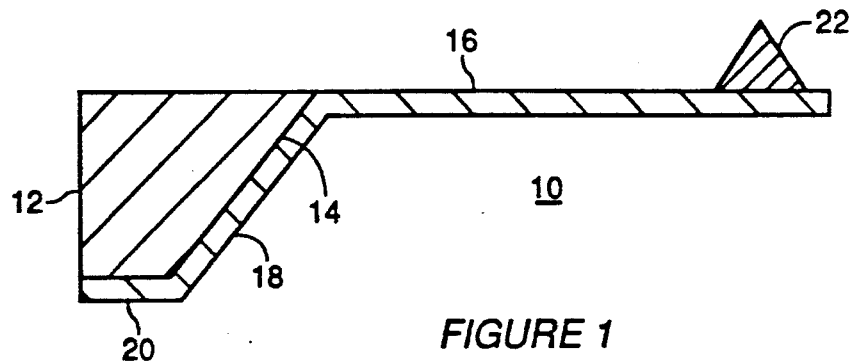
FIG. 1 is a sectional view of a nitride cantilever with a single-crystal silicon tip at the free end thereof.

FIG. 1 shows a microfabricated cantilever assembly 10 which includes a silicon base 12. The silicon base 12 is formed from a (100) silicon substrate which, as described hereinbelow, has been etched and anisotropically from its bottom surface to preferentially remove all of the crystal planes except the (111) plane. This leaves the surface 14 of the silicon base 12 extending obliquely as shown. A layer of silicon nitride is fabricated to form a nitride cantilever 16 which extends outwardly from the upper surface of the silicon base 12 as shown. The silicon nitride layer also includes a portion 18 on the oblique surface 14 of the silicon base 12 and a portion 20 on the bottom surface of the silicon base 12. At the free end of the silicon nitride cantilever 16 is formed a single-crystal sharp silicon tip 22 which is fixed to the end of the cantilever 16 and which extends upwardly on the free end of the nitride cantilever 16.

Figure 2:
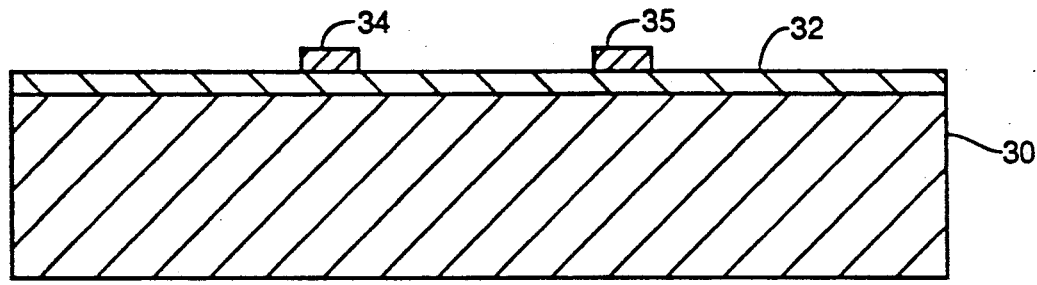
FIG. 2 is a sectional view of a (100) silicon substrate having a top doped-silicon or epitaxial silicon layer and small square-shaped layers of silicon oxide formed as tip masks thereupon.

The following figures illustrate various steps in the process used to form a silicon nitride cantilever 16 with an integrally attached sharp silicon tip 22:

FIG. 2 shows a (100) silicon substrate 30. The top surface of the silicon substrate 30 is doped to provide a doped silicon layer 32 on the silicon substrate 30. Note that the sharp silicon tip will be fabricated from this doped silicon layer 32. The thickness of the doped silicon layer 32 is approximately 5 micrometers thick. On top of the doped silicon layer 32 is grown an oxide layer which is patterned and etched to form silicon dioxide squares which are utilized as tip masks 34,35 for subsequent formation of silicon tips in the doped silicon layer 32 directly beneath the tip masks.

Alternatively, the top layer 32 is an epitaxial layer, for example, of N-type material formed on a P-type substrate or of P-type material on an N-type substrate.

Figure 3:
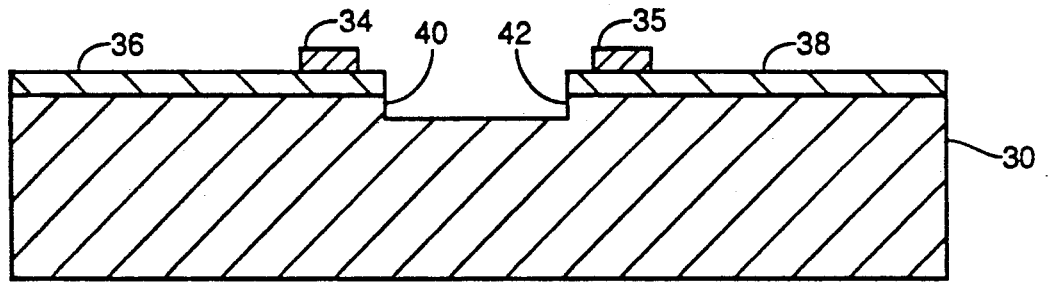
FIG. 3 is a sectional view of the silicon substrate with the top silicon layer etched to form doped-silicon cantilever patterns with the tip masks positioned near the ends of the cantilevers to be formed.

FIG. 3 shows the results of patterning and etching the doped silicon surface 32 and the silicon substrate 30 to define cantilever patterns 36,38 formed in the doped silicon layer 32. A thick photoresist layer (not shown) spun and patterned so that the tip masks 34,35 are, respectively, centered near the free ends of cantilevers to be subsequently formed. Dry etching is used to replicate the photoresist pattern in the silicon substrate 30 to produce vertical sidewalls at 40,42 in the doped silicon layer patterns 36,38 and in the silicon substrate 30.

Figure 4:
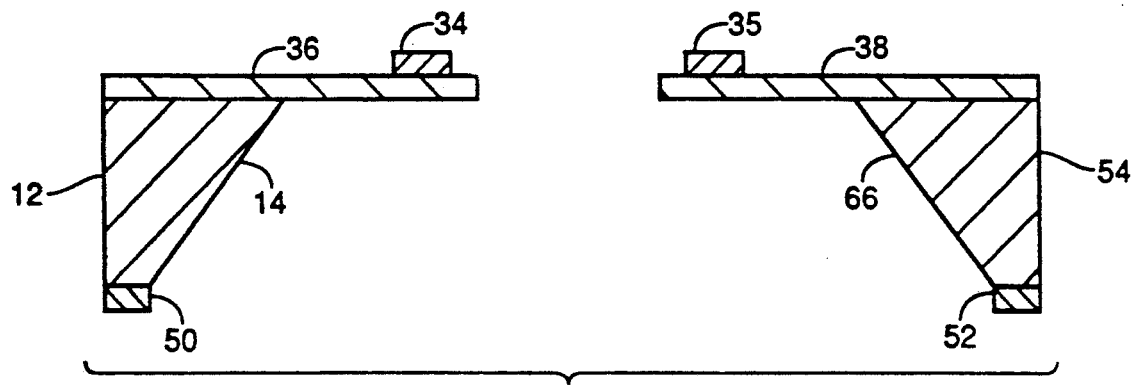
FIG. 4 is a sectional view of silicon cantilevers patterns formed by anisotropically etching the underlying silicon substrate.

FIG. 4 shows the remnants of a silicon dioxide layer 50,52 formed on the bottom, or back side, of the silicon wafer 30. This bottom layer of silicon dioxide is patterned and etched to provide a masking aperture, or opening, through which the silicon substrate 30 is anisotropically etched until the doped silicon layers 36,38 are reached to stop the etching. The etch step can be controlled either electrochemically or with the doping concentration of the doped layer. Anisotropic etching by electrochemical etching is accomplished by applying a small electric potential across the P-N junction formed between the epitaxial layer and the substrate. The electrochemical etch will etch the P-type substrate but will stop when the N-type epitaxial layer is reached. The thickness of the cantilever is controlled by controlling the thickness of the epitaxial layer. Alternatively, an N-type substrate and a P-type epitaxial layer are used. This anisotropic etching preferentially etches all the crystal claims of the silicon substrate 30 except the (111) planes which leave the silicon base 12 on one side of the figure and the silicon base 54 on the other side of the figure. This anisotropic etching releases the free end of the doped silicon or epitaxial silicon layer patterns 36,38 from the silicon substrate 30 such that the doped silicon layers 36,38 extend from the silicon bases 12,54 as cantilever members. The etching occurs such that the oblique surfaces 14,66 of the etched silicon substrate 30 are in the (111) planes and extend obliquely downward and away from the nitride cantilever structures 36,38.

Electrochemical etching is described by Jackson, et al. in *IEEE Electron Device Letters*, Vol. EOL-2, No. 2 February 1981, p. 44 in a paper entitled "An Electrochemical P-N Junction Etch-Stop for the Formation of Silicon Microstructures" and by Kloeck, et al. in *IEEE Transactions on Electron Devices*, Vol. 36, No. 4, April 1989, p. 663 in a paper entitled "Study of Electrochemical Etch-Stop for High-Precision Thickness Control of Silicon Membranes."

Figure 5:
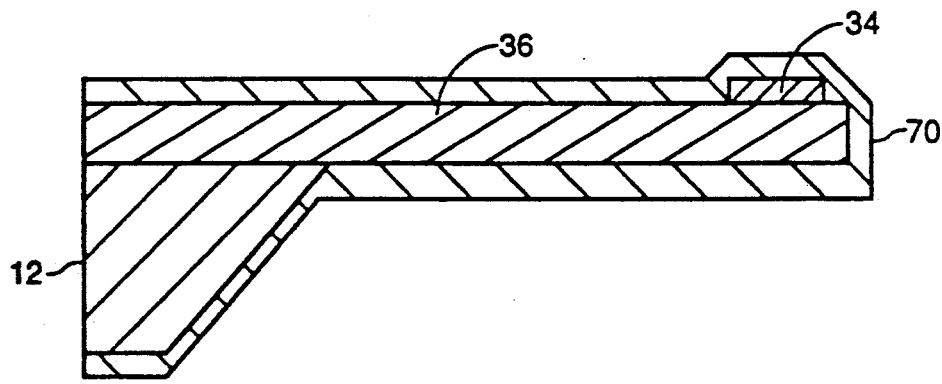
FIG. 5 is a sectional view of a silicon cantilever pattern which has a nitride layer deposited on its front and back sides.

FIG. 5 shows the bottom oxide layer remnants 50,52 removed. The structures previously formed as shown in FIG. 4 are covered with a silicon nitride layer 70.

Figure 6:
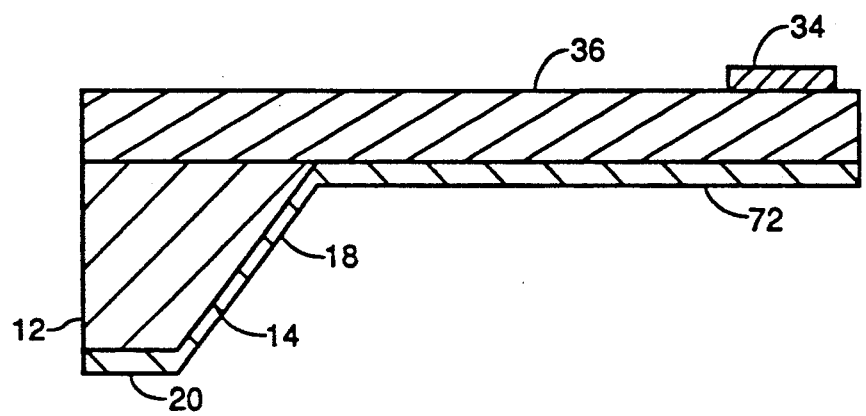
FIG. 6 is a sectional view of a cantilever pattern with nitride on its back side, where the nitride will form a nitride cantilever.

FIG. 6 shows the structural FIG. 5 wherein the silicon nitride layer on the top surface of the structure has been removed from the top side by, for example, a reactive ion etch having a high content of fluorine atoms such that a polymer is formed on the bottom, or back side, of the structure to prevent the back side from being etched. Note that the thickness of the portion 72 of the nitride layer formed on the bottom of the doped silicon or epitaxial silicon layer pattern 36 will be the nitride cantilever and therefore the thickness of the nitride layer portion 72 determines the thickness of the final cantilever structure. The silicon nitride layer also has a portion 18 which covers the oblique wall 14 of the silicon base 12. The bottom of the silicon base 12 is also covered with a portion 20 of the silicon nitride layer.

Figure 7:
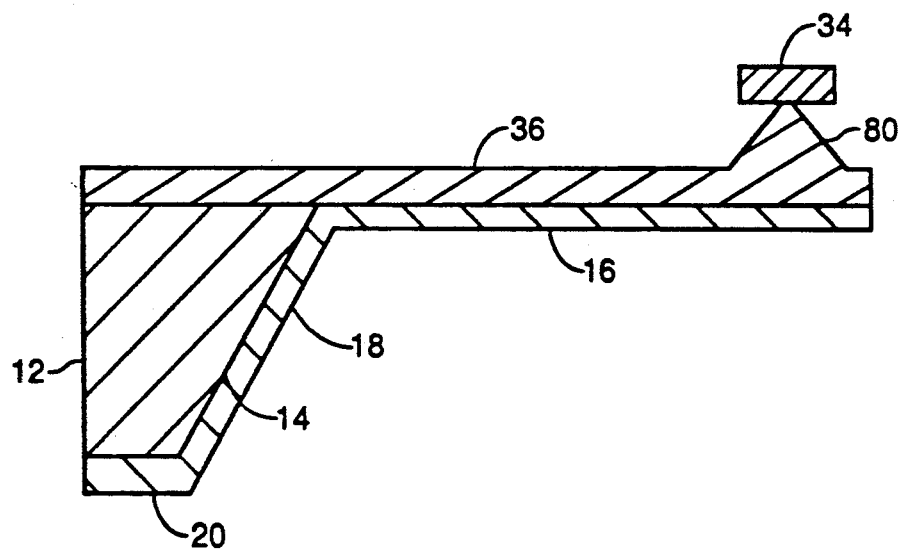
FIG. 7 is a sectional view of a cantilever pattern with the silicon layer etched to form a single-crystal silicon tip.

FIG. 7 shows the structure being formed after the doped silicon or epitaxial silicon layer pattern 36 has been dry etched and a tip structure 80 begins to form at the free end of the nitride cantilever 16 beneath the tip mask 34. Etching of the silicon layer 36 is performed with dry etching.

FIG. 1 shows the results of completing the etching and removal of the doped silicon layer 36 by wet etching and removing the oxide tip mask 34. The tip 22 can be further sharpened by oxidizing the tip 22 which forms a thicker oxide near the point of the tip such that, when the oxide is removed, the silicon remaining is sharper.

The cantilever patterns formed in FIG. 3 can be formed after the silicon substrate 30 is etched, as indicated by FIG. 4.

One of the advantages of the processes described hereinabove is that this process provides a nitride cantilever which has proved to be a very robust material for microfabricated cantilevers for atomic force microscopy (AFM) which is combined with a single crystal silicon tip. Single crystal silicon tips provide one of the sharpest tips that it is possible to make with semiconductor microfabrication process techniques.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

In the claims:

1. A method of forming a microfabricated cantilever with an integral silicon tip at the free end thereof, comprising the steps of:
   providing a (100) silicon substrate having a top surface and a bottom surface;
   providing a top layer of doped silicon material on the top surface of said silicon substrate;
   forming a top layer of silicon dioxide on the top layer of doped silicon material;
   patterning and etching said top layer of silicon dioxide to provide a tip mask for subsequent formation of a silicon tip in said top layer of doped silicon material;
   patterning and etching a top portion of the silicon substrate immediately beneath the top layer of doped silicon material and the top layer of doped silicon material so as to define a cantilever pattern with the tip mask being positioned to be near a free end of a cantilever to be subsequently formed;
   forming a bottom layer of silicon dioxide on the bottom surface of said silicon substrate;
   patterning and etching said bottom layer of silicon dioxide to define a masking aperture in the bottom silicon dioxide layer;
   anisotropically etching said silicon substrate from the bottom surface of said silicon substrate through said masking aperture, said anisotropic etching stopping at the top layer of doped silicon material layer to release a cantilever free end of the patterned top layer of doped silicon material from the silicon substrate, said anisotropic etching removing all of the crystal planes of the silicon substrate except the (111) planes to leave a silicon base having an oblique surface and from which extends the free end of the top layer of the doped silicon material as a doped silicon cantilever member;
   removing the bottom layer of silicon dioxide;
   forming a layer of nitride over a bottom surface of the doped silicon cantilever member and the bottom and oblique surfaces of the silicon substrate to form a nitride cantilever beneath the doped silicon layer;
   selectively removing the top layer of doped silicon material with the tip mask thereupon to form a pointed silicon tip beneath said tip mask near the free end of the nitride cantilever and to provide a nitride cantilever having an integrally formed silicon tip at the free end thereof.

2. The method of claim 1 wherein the top layer of doped silicon material is doped with boron.

3. The method of claim 1 including the step of forming the top layer of doped silicon material as an epitaxial layer of doped silicon formed on the silicon substrate and having a dopant type opposite to the dopant type of the silicon substrate.

4. The method of claim 1 wherein the step of anisotropically etching said silicon substrate includes:
   providing an electric potential across the P-N junction formed by said top layer of doped silicon material and said silicon substrate; and
   anisotropically etching the silicon substrate by electrochemical etching and stopping the anisotropic etching when the top layer of doped silicon material is reached.

5. The method of claim 1 wherein the step of forming the layer of nitride includes depositing a layer of nitride over the entire surface of the doped silicon cantilever member and the silicon base and removing nitride on a top surface of the doped silicon cantilever to leave the layer of nitride on the bottom surface of the layer of doped silicon material layer and the bottom and oblique surfaces of the silicon substrate.

6. The method of claim 1 wherein the tip mask is formed as a rectangular layer of silicon dioxide.

7. The method of claim 1 wherein a plurality of tip masks and a corresponding plurality of nitride cantilevers each with an integrally formed silicon tip are formed simultaneously.

8. The method of claim 1 wherein the silicon base is formed to have a (111) face extending obliquely down and away from the nitride cantilever.

9. The method of claim 1 further including the steps of:
   differentially oxidizing the integrally formed silicon tip under appropriate conditions so as to form an oxide layer having a lesser thickness on the point of the tip than on the sides of this tip;
   removing the oxide layer formed on the tip so as to provide a sharpened tip having a sharper profile than the original silicon tip.

10. The method of claim 1 wherein the tip is conical-shaped.

11. The method of claim 1 wherein the step of selectively removing the top layer of doped silicon material by using set etching.

12. The method of claim 1 wherein the top layer of doped silicon material is selectively removed by oxidizing said layer.

* * * * *